United States Patent
Gabrielson et al.

(10) Patent No.: US 11,496,565 B2
(45) Date of Patent: Nov. 8, 2022

(54) MULTI-SERVICE STORAGE LAYER FOR STORING APPLICATION-CRITICAL DATA

(71) Applicant: Amazon Technologies, Inc., Seattle, WA (US)

(72) Inventors: Jacob Adam Gabrielson, Seattle, WA (US); Joshua M Burgin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 225 days.

(21) Appl. No.: 16/818,815

(22) Filed: Mar. 13, 2020

(65) Prior Publication Data
US 2021/0289026 A1    Sep. 16, 2021

(51) Int. Cl.
| | |
|---|---|
| *H04L 67/1097* | (2022.01) |
| *G06F 16/182* | (2019.01) |
| *G06F 16/245* | (2019.01) |
| *G06F 9/455* | (2018.01) |
| *G06F 9/54* | (2006.01) |
| *H04L 67/60* | (2022.01) |

(52) U.S. Cl.
CPC ...... *H04L 67/1097* (2013.01); *G06F 9/45533* (2013.01); *G06F 9/45558* (2013.01); *G06F 9/541* (2013.01); *G06F 16/1844* (2019.01); *G06F 16/245* (2019.01); *H04L 67/60* (2022.05); *G06F 2009/45583* (2013.01)

(58) Field of Classification Search
CPC ....... G06F 9/455; G06F 9/45533; H04L 67/42
See application file for complete search history.

(56) References Cited

U.S. PATENT DOCUMENTS

| | | | |
|---|---|---|---|
| 9,876,703 B1 | 1/2018 | Arllen et al. | |
| 2011/0126275 A1* | 5/2011 | Anderson | H04L 63/08 726/8 |
| 2019/0342390 A1 | 11/2019 | Iancu et al. | |
| 2019/0391712 A1* | 12/2019 | Singh | H04L 67/02 |

OTHER PUBLICATIONS

International Search Report and Written Opinion, PCT App. No. PCT/US21/17008, dated May 31, 2021, 17 pages.

* cited by examiner

*Primary Examiner* — Barbara B Anyan
(74) *Attorney, Agent, or Firm* — Nicholson De Vos Webster & Elliott LLP

(57) ABSTRACT

Techniques are described for providing a multi-service storage layer in a cloud provider network for applications and workloads that are highly sensitive to outages affecting "mission critical" data or other resources. A multi-service storage layer is designed to provide additional resiliency against various types of correlated failures among existing geographic regions by enabling the storage of data using a plurality of separate storage services and storage resource types and across a plurality of regions of the cloud-provider network. A multi-service storage layer provides an application programming interface (API) with actions for storing, retrieving, and querying data stored in a highly available storage resource across a selection of underlying storage services. The ability to store critical data and other resources using a multi-service storage layer provides additional resiliency while also providing a single interface that applications can use to interact with the data stored across any number of underlying storage services.

20 Claims, 8 Drawing Sheets

MULTI-SERVICE STORAGE LAYER FOR STORING APPLICATION-CRITICAL DATA

BACKGROUND

Modern businesses and other entities increasingly rely on a wide variety of computing systems and workloads to operate efficiently. The increased reliance on such computing systems has placed an importance on the availability of many types of workloads and associated data sets. In this context, availability generally refers to a level of operational performance, such as "uptime," in which a computing system and associated data is accessible. A number of techniques are commonly used to increase the availability of computing systems and associated data sets such as, for example, utilizing redundant computing systems and workloads, efficiently detecting occurrences of failures, and providing efficient failover mechanisms.

BRIEF DESCRIPTION OF DRAWINGS

Various embodiments in accordance with the present disclosure will be described with reference to the drawings, in which.

DETAILED DESCRIPTION

Figure 1:
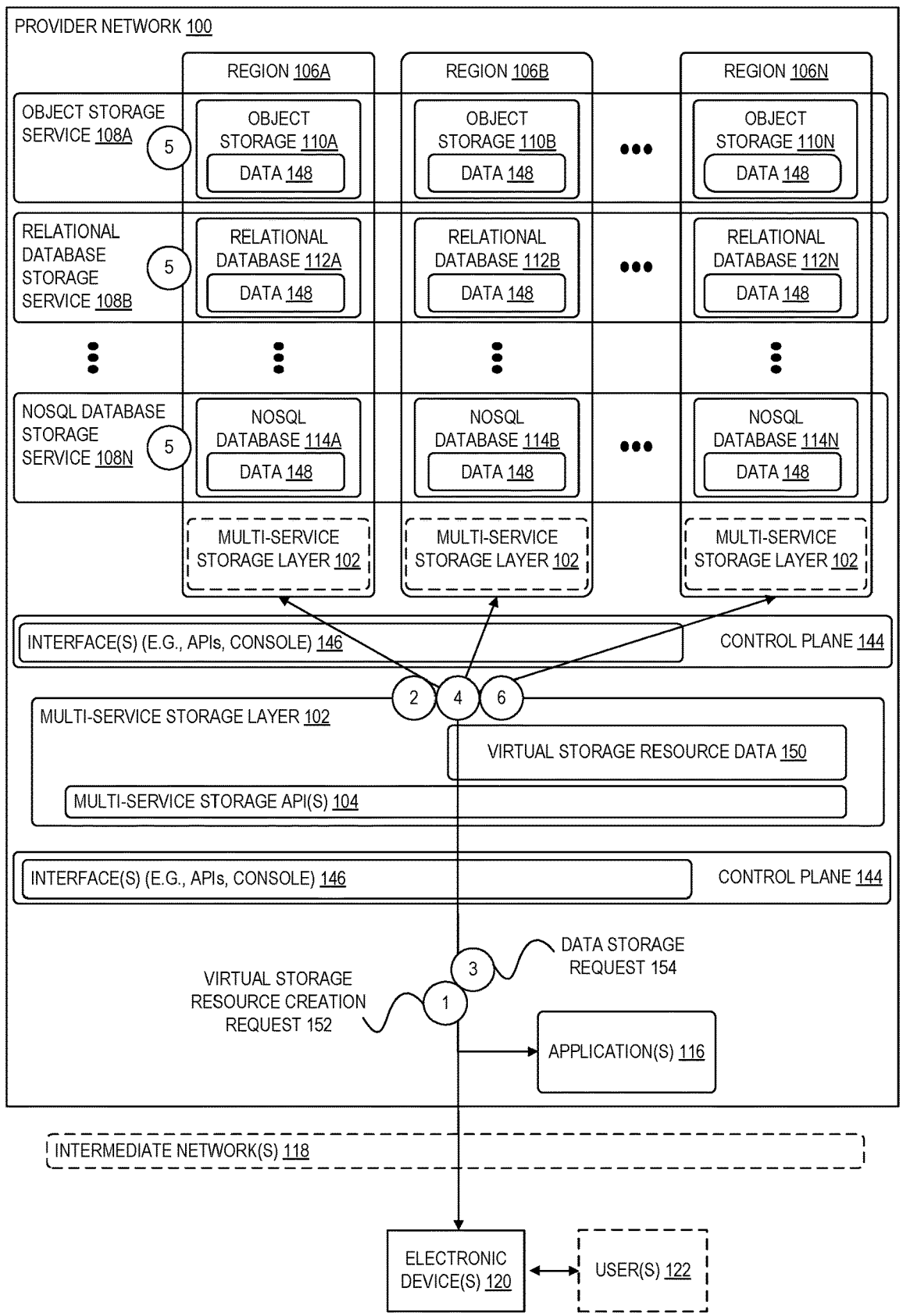
FIG. 1 is a diagram illustrating an environment including a cloud provider network comprising a multi-service storage layer used to provide highly available storage resources for application-critical data and other resources according to some embodiments.

The present disclosure relates to methods, apparatus, systems, and non-transitory computer-readable storage media for providing a multi-service storage layer in a cloud provider network for applications and workloads that are highly sensitive to outages affecting "mission critical" data stored using storage resources of the cloud provider network. The sensitivity of such workloads to the unavailability of critical data may be due to financial, regulatory, safety, or other reasons (e.g., where such workloads may require approximately 99.995% or greater availability to such data on a yearly basis). As an example, a financial institution may use cloud-based resources to support customers' ability to perform banking activities, with data associated with customers' bank account balances, data indicating an identity of master databases, and other operational data being examples of mission critical data in this context. In this example and others, even relatively short interruptions to the availability of the data would have a noticeable business impact and possible domestic or global financial impact. Applications and workloads that rely on critical data are often configured to store the data in multiple regions of a cloud provider network to increase the data's availability compared to storing the data in a single region. Although the existing infrastructure of a cloud provider can be designed for high resilience by having geographic compartmentalization and redundant systems in place, in certain edge cases, it may be possible to have correlated failures between regions for a given storage service or type of storage resource, for example, due to software updates deployed to all regions in which a storage service operates. For applications and workloads that depend on critical data, it can be desirable to further mitigate the likelihood of a temporary interruption in the availability of data upon which the applications rely.

The aforementioned challenges, among others, are addressed in some embodiments by the disclosed technology for a multi-service storage layer provided by a cloud provider network. The multi-service storage layer can provide access to the same underlying data through different storage services of the cloud provider network, and is designed for use by applications and workloads that rely upon critical data or other resources for which high availability is desired. According to some embodiments, a multi-service storage layer is designed to provide additional resiliency against various types of correlated failures among existing geographic regions by enabling the storage of data using a plurality of separate storage services and storage resource types. For example, users can use a multi-service storage layer to create highly available storage resources that are replicated across two or more different types of storage services (e.g., across an object storage service, a file storage service, a relational database storage service, a key-value and document database, etc.) and across two or more regions of the cloud provider network. In some embodiments, a multi-service storage layer provides a separate application programming interface (API) with actions for storing, retrieving, and querying data stored in a highly available storage resource across a selection of underlying storage services. The actions provided by the multi-service storage layer API may depend on the constraints imposed by the selected set of storage services used to provide a highly available storage resource, for example, in terms of a maximum object size that can be stored in the storage resource, types of schemas that can be used, ways in which the data can be queried, and so forth. Among other benefits, the ability to store critical data and other resources using a multi-service storage layer provides additional resiliency while also providing a single interface that applications can use to interact with the data stored across any number of underlying storage services. Other ways in which a multi-service storage layer can be used to provide additional availability assurance are described in more detail herein.

FIG. 1 is a diagram illustrating an environment for providing a multi-service storage layer that can be used to provide highly redundant storage resources. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users 122 (or "customers") of provider networks 100 may utilize one or more user accounts that are associated with a customer account, though these terms may be used somewhat interchangeably depending upon the context of use. Users may interact with a provider network 100 across one or more intermediate networks 118 (e.g., the internet) via one or more interface(s) 146, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 146 may be part of, or serve as a front-end to, a control plane 144 of the provider network 100 that includes "backend" services supporting and enabling the services that may be more directly offered to customers.

For example, a cloud provider network 100 (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 100 can be formed as a number of regions (e.g., regions 106A, 106B, . . . , 106N), where a region is a geographical area in which the cloud provider clusters data centers. Each region can include multiple (e.g., two or more) availability zones (AZs) connected to one another via a private high-speed network, for example, a fiber communication connection. An AZ provides an isolated failure domain including one or more data center facilities with separate power, separate networking, and separate cooling from those in another AZ. AZs within a region are positioned far enough away from one other that a same natural disaster (or other failure-inducing event) should not affect or take more than one AZ offline at the same time. Customers can connect to an AZ of the cloud provider network via a publicly accessible network (e.g., the Internet, a cellular communication network).

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As indicated above, if a user has developed an application or workload that relies upon one or more data sets that are critical to the operation of the application or workload, the user may strive to store the data sets in a manner that enables access to the data in the event of various types of outages within the cloud provider network. For example, a user may strive to store the data such that if a particular storage service or region of the cloud provider network experiences an outage, the application can still access a copy of the data stored elsewhere (e.g., stored at another storage service or region of the cloud provider network 100). According to embodiments described herein, in these examples and others, a user can use a multi-service storage layer 102 to create virtual storage resources that store user data in a redundant fashion across a plurality of separate storage services and across a plurality of regions of a cloud provider network 100. In some embodiments, a multi-service storage layer 102 includes one or more services or applications running as part of the cloud provider network 100, and which may further include various control plane components, manages access to the various underlying storage services, as described herein.

Referring to FIG. 1, the numbered circles "1"-"6" illustrate a process that includes a multi-service storage layer 102 receiving a request 152 to create a virtual storage resource, creating a corresponding storage resource at each of a plurality of storage services (e.g., across an object storage service 108A, a relational database storage service 108B, a NoSQL database storage service 108N, and the like) and across a plurality of regions of the cloud provider network 100 (e.g., across region 106A, region 106B, . . . , and a region 106N), receiving a request 154 to store a data item in the virtual storage resource, and storing the data item in a storage resource at each of the storage services and in each of the regions responsive to the request. As illustrated in FIG. 1, a multi-service storage layer 102 can be implemented as a service that is globally accessible to resources across regions of a provider network 100 (e.g., across regions 106A, 106B, . . . , 106N), implemented in a distributed fashion with implementations of the service running across some or all regions of the provider network 100, or any combination thereof.

In some embodiments, at circle "1" in FIG. 1, a user 122 uses an electronic device 120 to send a request 152 (or an application 116 sends a request 152) to a multi-service storage layer 102 to create a virtual storage resource to be replicated across a set of storage services and across a set of regions of a cloud provider network. In some embodiments, communications between electronic device(s) 120 and the cloud provider network 100 can be routed through interface(s) 146, such as through use of API calls, via a console implemented by the multi-service storage layer 122 as a website or using a command-line application, and so forth. In addition to serving as a frontend to control plane services, the interface(s) 146 can perform operations such as verifying the identity and permissions of the user initiating a request, evaluating the request and routing it to the appropriate control plane services, and the like. As indicated, a user or application might request the creation of a virtual storage resource as a resource to store data that is critical the operation of an associated application or workload or for which the user otherwise desires high availability assurance.

In some embodiments, a request 152 sent to a multi-service storage layer 102 to create a virtual storage resource specifies a set of storage services to use from a plurality of storage services provided by the cloud provider network. For example, a user may indicate in the request a desire to use each of an object storage service 108A, a relational database storage service 108B, and a NoSQL database storage service 108N (or key-value and document database service) as the underlying storage services to be used to store a redundant copy of the data stored in the virtual storage resource. In some embodiments, a cloud provider network 100 enables users to select a set of two or more storage services from any number of storage services provided by the cloud provider network 100, where there may exist a trade-off between the number and diversity of selected storage services and the types of supported functionality in terms of storable object size, types of schemas that can be used, and query support, as described in more detail elsewhere herein. In some embodiments, the multi-service storage layer 102 automatically selects a default set of storage services if a user does not specify a set of storage services. The specification of the set of storage services to be used can be included as part of the request to create the virtual storage resource or included in one or more separate requests to the multi-service storage layer 102.

In some embodiments, the request 152 sent to a multi-service storage layer 102 to create the virtual storage resource further specifies a set of regions to use from a plurality of regions provided by the cloud provider network. As indicated above, the infrastructure provided by a cloud provider network 100 can be formed as a number of regions (e.g., regions 106A, 106B, . . . , 106N), where a region may be a geographical area in which the cloud provider clusters data centers. The number of regions selected to use further increases a redundancy factor of the virtual storage resource by increasing the number of separate copies of each type of storage resource created at each selected type of storage service.

In some embodiments, the selected set of storage services may be associated with a heterogeneous set of types of storage, for example, an object storage service 108A provides key-based object stores, while a relational database storage service 108B provides relational databases, and so forth. Furthermore, each of the selected set of storage services may be associated with distinct types of interfaces used to create storage resources, to create, modify, and delete data, and to access or query data. A multi-service storage layer 102 is thus designed to provide a unified interface that enables users and applications 116 to store and access data in a highly available manner without having to directly interface with each of the separate underlying storage services and storage resources across any number of distinct regions.

In some embodiments, the multi-service storage layer 102 itself operates across any number of regions of the cloud provider network 100. For example, the request sent to the multi-service storage layer 102 to create a virtual storage resource can be sent to an implementation of the multi-service storage layer 102 running in any of regions 106A, 106B, . . . , 106N, or any other region of the provider network 100. In other embodiments, the multi-service storage layer 102 operates in a global setting without an association with any particular region of the provider network 100.

In some embodiments, at circle "2," the multi-service storage layer 102 creates a storage resource at each of the storage services and within each region of the regions specified in the request received at circle "1," where the resulting set of storage resources are to be used to redundantly store data items requested for storage in the virtual storage resource managed by the multi-service storage layer 102. In some embodiments, the multi-service storage layer 102 further creates virtual storage resource data 150 for each created virtual storage resource, where the data is used to track metadata about the virtual storage resource and underlying storage resources including, for example, identifiers of the storage services used, identifiers of the regions used, identifiers of the storage resources created at each storage service, information about operations being requested and committed, and the like. In the example illustrated in FIG. 1, the multi-service storage layer 102 creates object storage resources (e.g., object storage 110A, object storage 110B, . . . , and object storage 110N) using an object storage service 108A within each of regions 106A, 106B, . . . , 106N, creates relational databases (e.g., relational database 112A, relational database 112B, . . . , and relational database 112N) using a relational database storage service 108B within each of regions 106A, 106B, . . . , 106N, and further creates NoSQL databases (e.g., NoSQL database 114A, NoSQL database 114B, . . . , and NoSQL database 114N) using an NoSQL database service 108N within each of regions 106A, 106B, . . . , 106N. As indicated above, in some embodiments, identifiers of each of the created storage resources and other connection details may be stored as part of the virtual storage resource 150 managed by the multi-service storage layer 102.

In some embodiments, responsive to the request to create the virtual storage resource, the multi-service storage layer 102 returns a virtual storage resource identifier that can be used to identify the virtual storage resource in future requests to store and access data items stored in association with the virtual storage resource or to otherwise manage the virtual storage resource. In some embodiments, the multi-service storage layer 102 further returns identifiers of the storage resources created at each of the selected storage services and regions.

In some embodiments, at circle "3," the multi-service storage layer 102 receives a request 154 to store a data item in the created virtual storage resource. In some embodiments, the request 154 is sent using a multi-service storage API 104 provided by the multi-service storage layer 102. As indicated above, the actions and parameters available in the API can depend on the selection of the storage services and regions described above. For example, if one selected storage service supports storing data objects up to 5 terabytes in size, while another supports storing objects up to 16 gigabytes in size, while yet another supports storing objects up to 1 gigabyte in size, the multi-service storage layer 102 may provide an API to the user or application that limits data objects to 1 gigabyte in size to ensure that requests can be satisfied by all of the underlying storage services. As another example, if one or more the storage services supports only key-based access to stored data items, the only API action for accessing data items may be key or primary key-based despite other types of data object retrieval mechanisms supported by one or more of the services. In some embodiments, other limiting factors can include types of supported schemas, request rate limits, and so forth. In general, in some embodiments, a multi-service storage layer 102 provides a "lowest-common denominator" multi-service storage API 104 for each created virtual storage resource depending on the selected set of storage services.

In some embodiments, at circle "4," the multi-service storage layer 102 causes the data item to be stored in the respective storage resource of each storage service of the set of storage services and within each region of the set of regions (e.g., as part of data 148 replicated across the services and regions). In some embodiments, the multi-service storage layer causes the data item to be stored by sending a plurality of second requests to store the data item using a plurality of respective second APIs (or other connection mechanisms) provided by the set of storage services using a respective API or other connection mechanism provided by the respective storage services.

Figure 2:
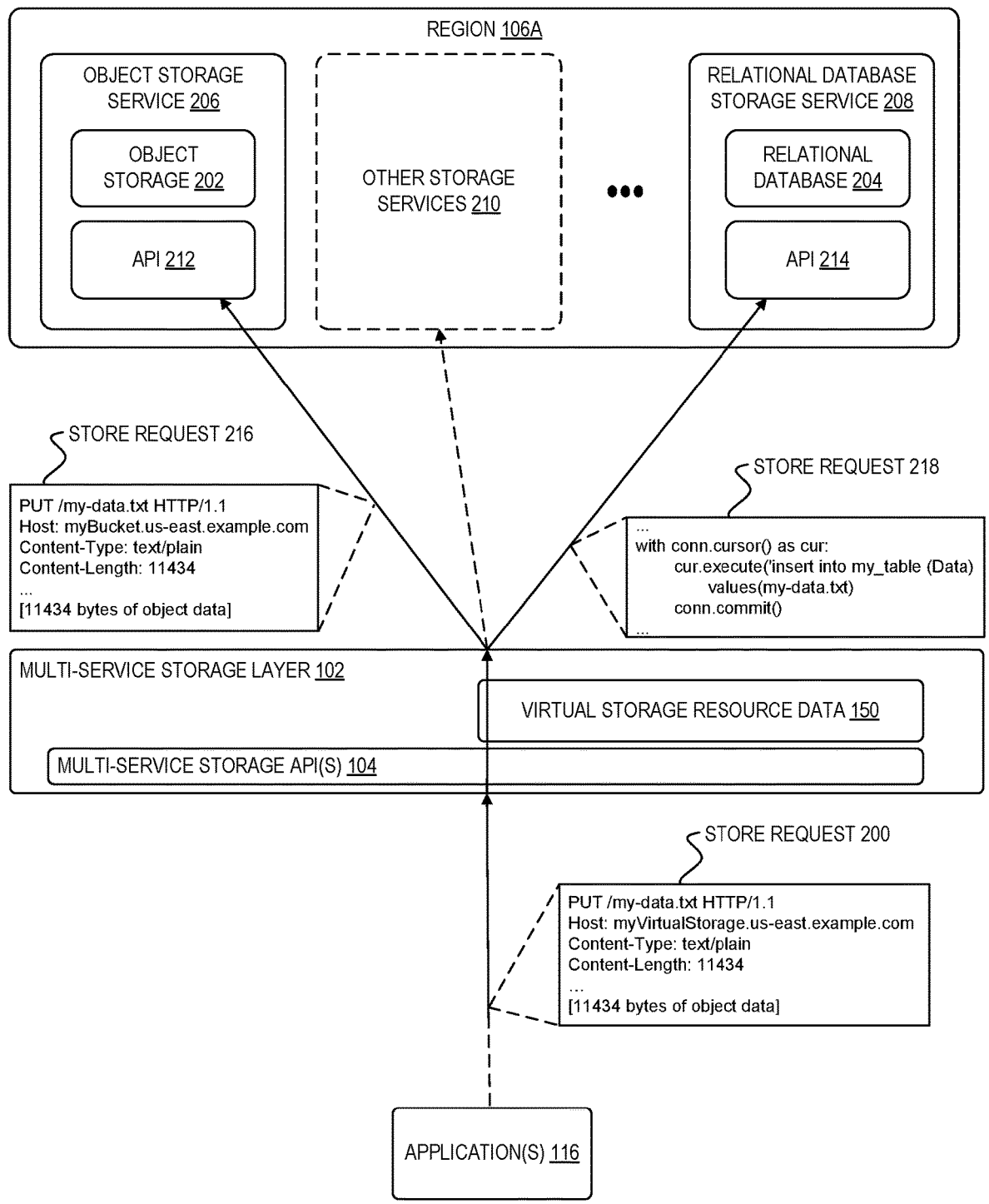
FIG. 2 is a diagram illustrating a multi-service storage layer of a cloud provider network processing a request to store a data item in a highly available virtual storage resource managed by the multi-service storage layer according to some embodiments.

FIG. 2 is a diagram illustrating a multi-service storage layer of a cloud provider network processing a request to store a data item in a highly available storage resource managed by the multi-service storage layer according to some embodiments. As illustrated, a multi-service storage layer 102 receives a request 200 to store a data object (e.g., a text file "my-data.txt"), where the request is sent using a multi-service storage layer API 104. In FIG. 2, the request 200 is an example HTTP-based request sent to an endpoint provided by the multi-service storage layer 102, where the request includes an identifier of the data to be stored, an indication that storage of the data object is desired, an identifier of the virtual storage resource in which the data object is to be stored, a copy of the data object contents, among other possible parameters.

In some embodiments, responsive to receiving a request 200, the multi-service storage layer 102 accesses data stored as part of a virtual storage resource data 150 to obtain identifiers and possibly other information related to the underlying storage resources that form the virtual storage resource. Once the underlying storage resources are identified, the multi-service storage layer 102 causes the requested data object to be stored at each of the underlying storage resources. FIG. 2 illustrates an example of the multi-service storage layer 102 storing the requested data object at each of plurality of storage resources (e.g., an object storage 202, a relational database 204, among other possible storage resources) provided by a plurality of separate storage services (e.g., an object storage service 206, a relational database storage service 208, and other possible storage services 210) within a single region 106A. A similar process may be performed by the multi-service storage layer 102 within each region at which storage resources have been provisioned for the virtual storage resource.

As illustrated in FIG. 2, in some embodiments, each of the storage services is associated with a separate API used to interact with the service and storage resources provisioned by the storage service (e.g., the API 212 used to interact with the object storage service 206 and the API 214 used to interact with the relational database storage service 208). Each of these APIs may be associated with a distinct set of API actions, parameters, connection mechanisms, and so forth. For example, an object storage service 206 may provide a RESTful API to which HTTP-based requests can be submitted, while a relational database storage service 208 provides a RESTful API for some database-related operations and other interfaces (e.g., an Open Database Connectivity API, a Java Database Connectivity API, etc.) for performing other types of database operations. Other types of storage services may provide entirely other types of interfaces and available actions.

As shown, responsive to the request 200 to store the data object, the multi-service storage layer 102 generates a separate store request to each of the respective storage services associated with the corresponding virtual storage resource. For example, the multi-service storage layer 102 generates a request 216 sent to the object storage service 206 based on the API 212, a request 218 sent to the relational database storage service 208 based on the API 214, among other possible requests sent to other storage services, where each of the requests may generally include an identifier of the corresponding storage resource provided by the respective storage resource, indicate a desire to store the requested data object, include a copy of the data object or an identifier of a location of the data object, among other possible parameters. In some embodiments, responsive to receiving the request to the store the data object, each of the respective storage services stores the data object in the corresponding storage resource managed by the respective storage service and optionally sends a response indicating whether storage of the data object was successful or not.

In some embodiments, the multi-service storage layer 102 maintains a mapping between data items and storage locations at various storage services (e.g., at a data item-level, byte level, or at any other level of granularity). The mapping, for example, may be used by the multi-service storage layer 102 to seamlessly translate requests for data items from one storage service to another (e.g., queries for data items at one storage service can be readily translated into queries for the same data items at another storage service). This can enable the multi-service storage layer 102 to satisfy various types of API requests even in the event of storage service failures, changes, or other modifications. In some embodiments, the multi-service storage layer 102 also enables applications to failover from one storage service to another, e.g., in the event that a preferred underlying storage service is unavailable, as described in more detail elsewhere herein.

Returning to FIG. 1, in some embodiments, at circles "5," the respective storage services store the data item, as described above in reference to FIG. 2. In some embodiments, at circle "6," the multi-service storage layer 102 determines whether the data item is stored successfully at a threshold number of storage services of the set of storage services and at a threshold number of regions of the plurality of regions. In other embodiments, the storage service layer 102 determines whether the data item is stored successfully at a threshold number of storage services or regions. In general, the determination of whether the data item is stored successfully may be based on a quorum-based technique used to ensure consistency of the data stored across any number of regions and across a heterogeneous set of storage services. For example, each copy of a replicated data item across the regions and services is assigned a "vote" and an operation has to obtain quorum to read or write a data item. In some embodiments, a Paxos-based protocol is used to ensure durability of the data stored across the collective set of storage resources and regions.

Figure 3:
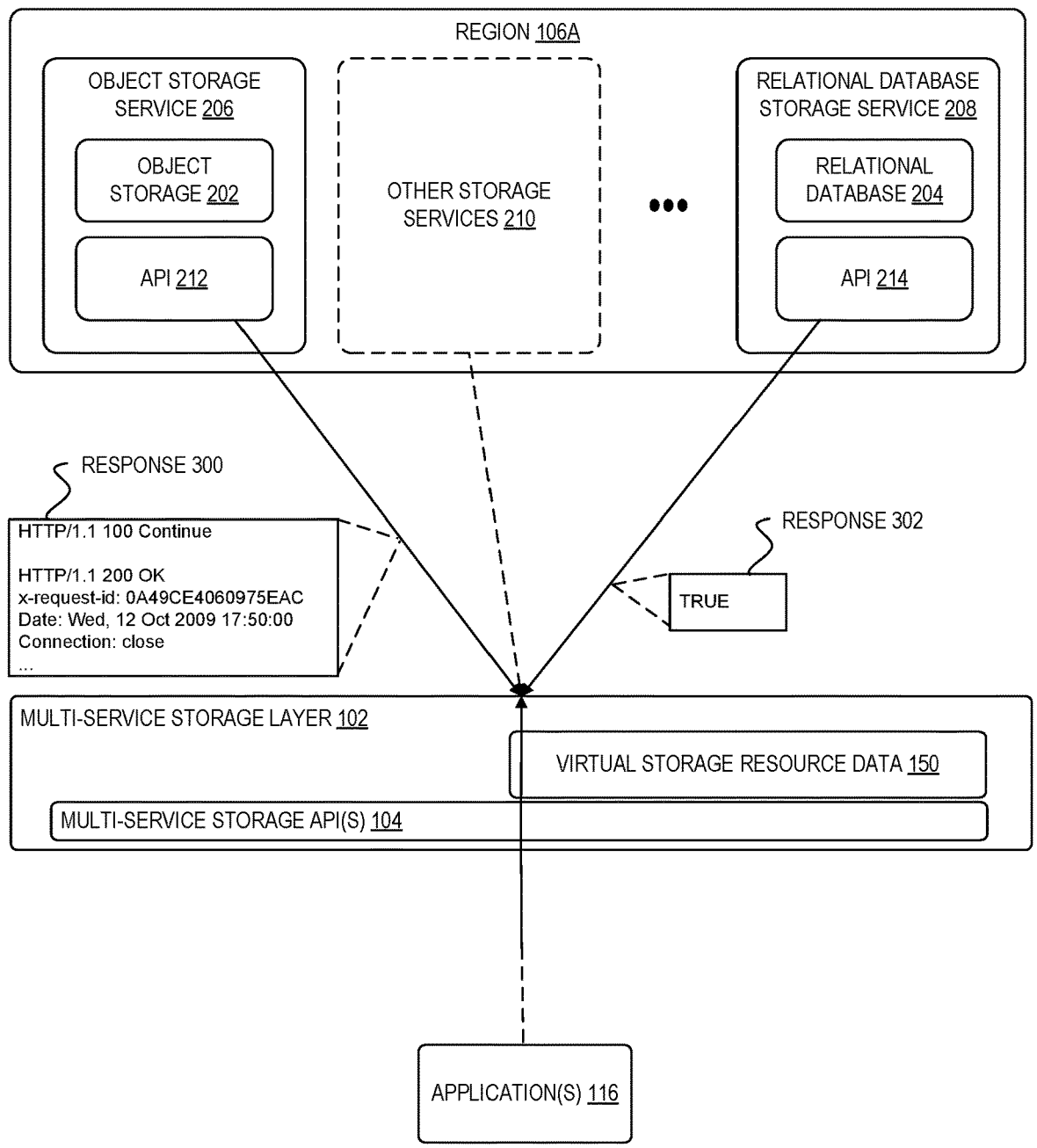
FIG. 3 is a diagram illustrating a multi-service storage layer of a cloud provider network determining the success of a requested operation performed relative to a plurality of underlying storage resources of a highly available virtual storage resource according to some embodiments.

FIG. 3 is a diagram illustrating a multi-service storage layer of a cloud provider network determining the success of a requested operation performed relative to a plurality of underlying storage resources of a highly available virtual storage resource. As shown, the multi-service storage layer 102 receives a response 300 and a response 302 from the object storage service 206 and the relational database storage service 208, respectively, responsive to the store requests sent as shown in FIG. 2 (and possibly receives other response messages from other storage services 210). The response messages received from each of the various services may be formatted differently depending on the API, for example, the response 300 is a HTTP-based response with various information about the status of the store operation, while a response from a relational database 204 may be a simple "true" or "false" value depending on the success of the operation. In some embodiments, the multi-service storage layer 102 interprets the responses from each of the various services to determine whether the store operation was successful at each service.

While the example of FIG. 1 illustrates a user generating a request to store a data item, in some embodiments, other operations are supported by the multi-service storage layer 102. For example, an API 104 provided by the safety storage service can include operations to read data items, modify existing data items, query for stored data items, and so forth. In some embodiments, the multi-service storage layer 102 may enable users to define a schema for the data stored across the various services and to query the data stored in a number of disparate formats based on the defined schema.

Figure 4:
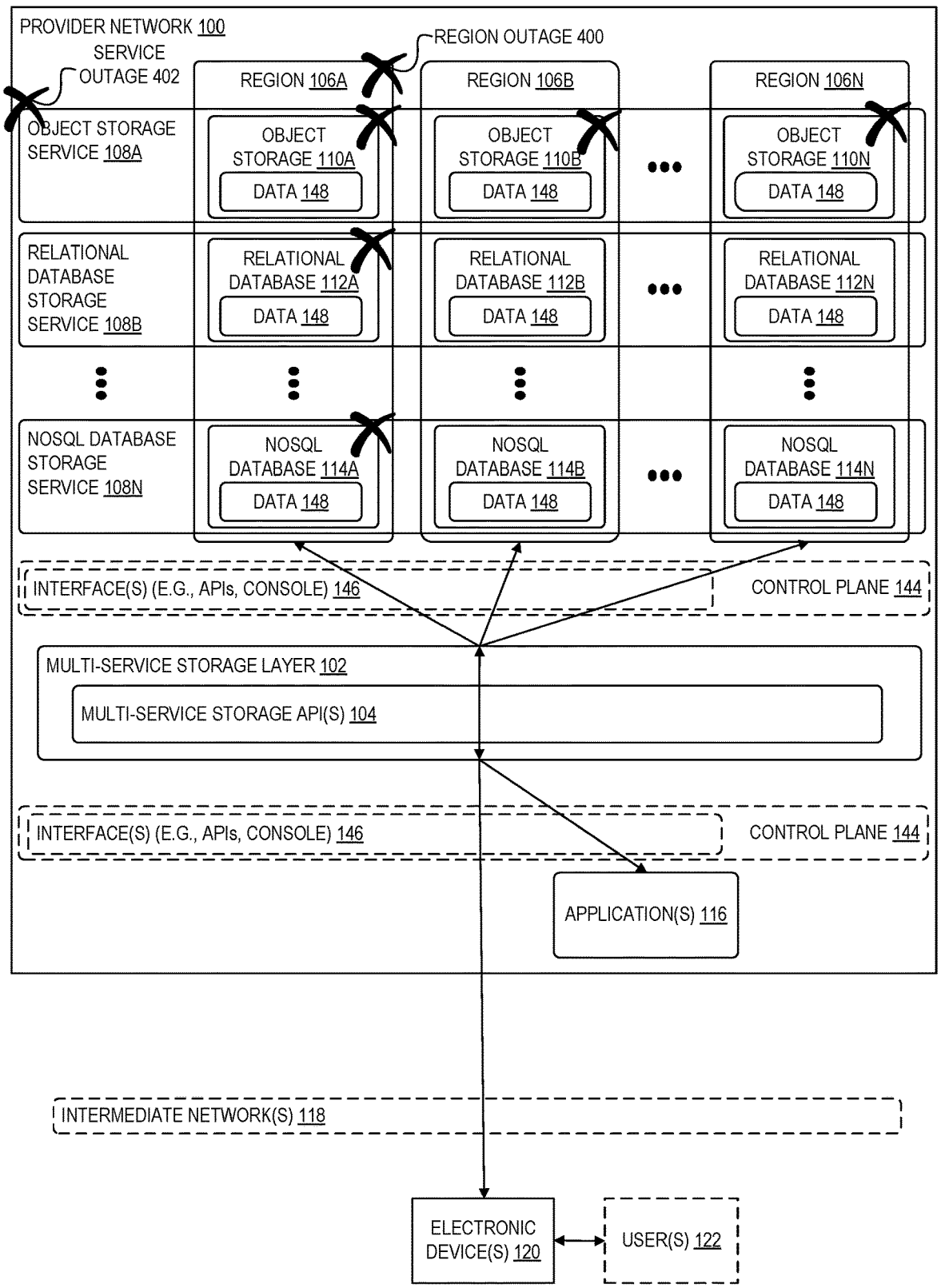
FIG. 4 is a diagram illustrating the ability to access data stored in a highly available storage resource managed by a multi-service storage layer during a service outage of at least one storage service, an outage of at least region of the cloud provider network, or both, according to some embodiments.

As indicated herein, one benefit of the multi-service storage layer 102 is the ability to access data stored in a virtual storage resource even in instances where a region of the cloud provider network 100 or an entire storage service across regions is experiencing an outage. Here, an outage can refer to any impairment or failure of a region or service that prevents users and other applications from accessing data stored within one or more services. FIG. 4 is a diagram illustrating the ability to access data stored in a highly available storage resource managed by a multi-service storage layer during a service outage of at least one storage service, an outage of at least region of the cloud provider network, or both, according to some embodiments.

As shown in FIG. 4, the cloud provider network 100 is currently experiencing a region outage 400, a service outage 402, or both, that is affecting the ability to access various storage sources stored within the cloud provider network 100. For example, if an application 116 is dependent upon data stored only in an object storage service 108A, in the example of FIG. 4, the application would be unable to access the data during the outage. As described herein, for data critical to applications implementing financial applications, emergency center applications, and the like, the inability to access the data for even a short period of time can be extremely problematic.

As illustrated in FIG. 4, however, an application 116 that uses data stored using a virtual storage resource that stores data items across a plurality of services and across a plurality of regions, the application is able to access data even in the event of service and region outages. For example, the multi-service storage layer 102 may detect the region outage 400 or service outage 402 and direct requests from applications 116 for data associated with a virtual storage resource to store resources associated with still available services and regions (e.g., data 148 stored in the relational database 112B, relational database 112N, NoSQL database 114B, and so forth). In some embodiments, the multi-service storage layer 102 can also continue inserting and modifying data stored in the available storage resources and ensure that the changes are replicated to the unavailable storage services and regions once the services or regions become available again.

In some embodiments, users or applications can alternatively access the storage resources associated with a virtual storage resource directly. For example, in order to execute more expressive queries or for other reasons, an application 116 may temporarily send queries or other requests via the multi-service storage layer 102 directly to a relational database 112B. In some embodiments, the application can access the storage resource directly using the storage resource identifiers returned to the application at the time the storage resources were created.

Figure 5:
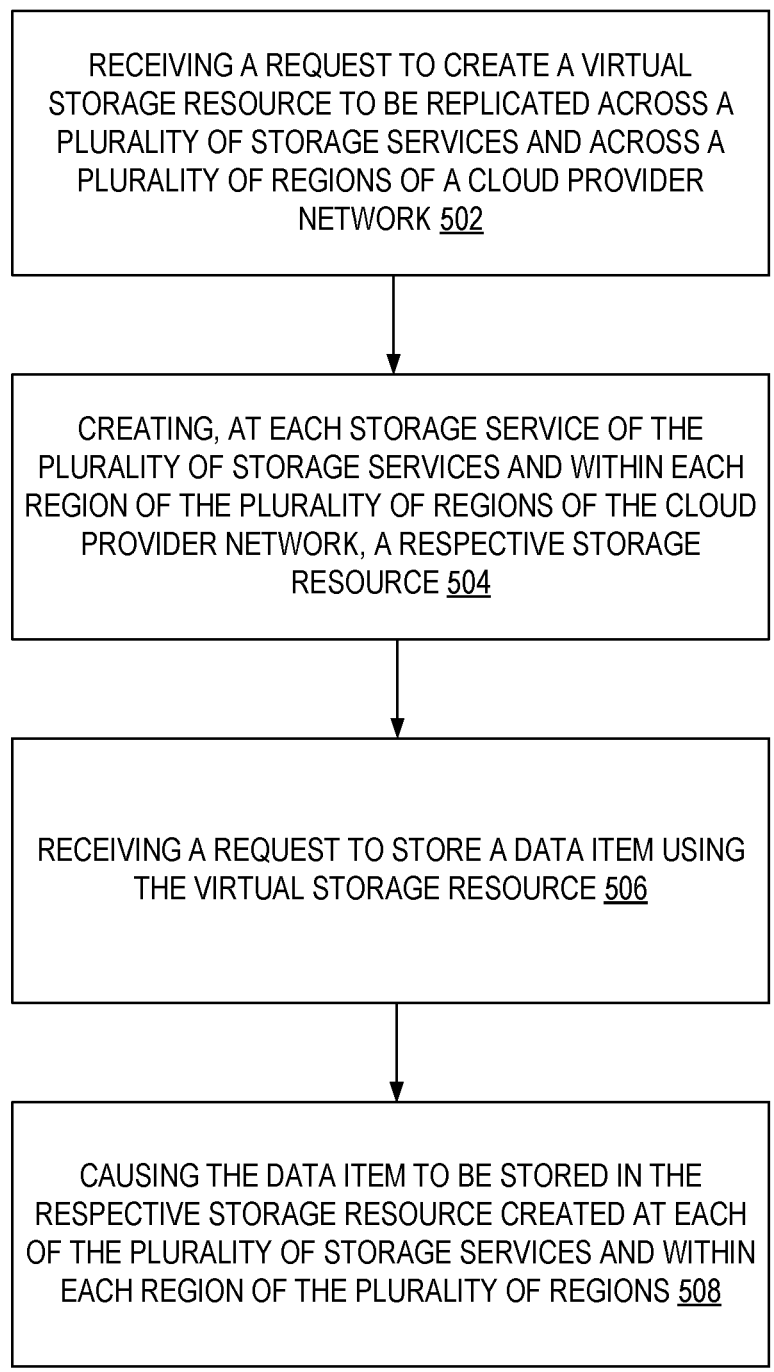
FIG. 5 is a flow diagram illustrating operations of a method for creating and using a highly available virtual storage resource managed by a multi-service storage layer provided by a cloud provider network according to some embodiments.

FIG. 5 is a flow diagram illustrating operations 500 of a method for creating and using a highly available virtual storage resource managed by a multi-service storage layer provided by a cloud provider network according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a multi-service storage layer 102 of the other figures.

The operations 500 include, at block 502, receiving a request to create a virtual storage resource to be replicated across a plurality of storage services and across a plurality of regions of a cloud provider network. In some embodiments, the request to create the virtual storage resource specifies: the plurality of storage services to use from storage services provided by the cloud provider network, and the plurality of regions to use from regions provided by the cloud provider network. In some embodiments, the request to store the data item using the virtual storage resource is sent from an application running in the cloud provider network. In some embodiments, the plurality of storage services includes at least two of: an object storage service, a relational database storage service, a key-value and document database service, a block storage service, a wide column storage service, a ledger storage service, or a file storage service.

The operations 500 further include, at block 504, creating, at each storage service of the plurality of storage services and within each region of the plurality of regions of the cloud provider network, a respective storage resource. In some embodiments, the virtual storage resource is managed by a multi-service storage layer of the cloud provider network, and wherein the multi-service storage layer stores metadata about the virtual storage resource including at least one of: identifiers of the plurality of the storage services, identifiers of the plurality of regions, or identifiers of the respective storage resources.

The operations 500 further include, at block 506, receiving a request to store a data item using the virtual storage resource. In some embodiments, the request to store the data item using the virtual storage resource is sent from an application running in the cloud provider network.

The operations 500 further include, at block 508, causing the data item to be stored in the respective storage resource created at each of the plurality of storage services and within each region of the plurality of regions.

In some embodiments, the request to create the virtual storage resource is sent to a multi-service storage layer of the cloud provider network using a first application programming interface (API), and wherein the plurality of storage services provide a plurality of second APIs. In some embodiments, the request to create the virtual storage resource is sent to a multi-service storage layer of the cloud provider network using a first application programming interface (API), and the first API provides a set of available actions that are defined in part by a respective set of actions provided by each of the plurality of storage services.

In some embodiments, the operations further include determining that the data item is stored successfully at a threshold number of storage services of the plurality of storage services, and determining that the data item is stored successfully in a threshold number of regions of the plurality of regions. In some embodiments, the operations further include determining that the data item is stored successfully at a threshold number of storage services, number of regions, or a combination thereof.

In some embodiments, the operations further include receiving a request to obtain the data item from the virtual storage resource, and obtaining the data item from a storage service of the plurality of storage services that is not experiencing a service outage.

In some embodiments, the operations further include receiving a query against data stored in the virtual storage resource, and executing the query against at least one respective storage resource created at the plurality of storage services.

In some embodiments, the operations further include receiving a request to perform an operation relative to a data item stored in a particular storage resource created at a particular storage service of the plurality of storage services, and causing the particular storage service to perform the operation relative to the data item stored in the particular storage resource.

Figure 6:
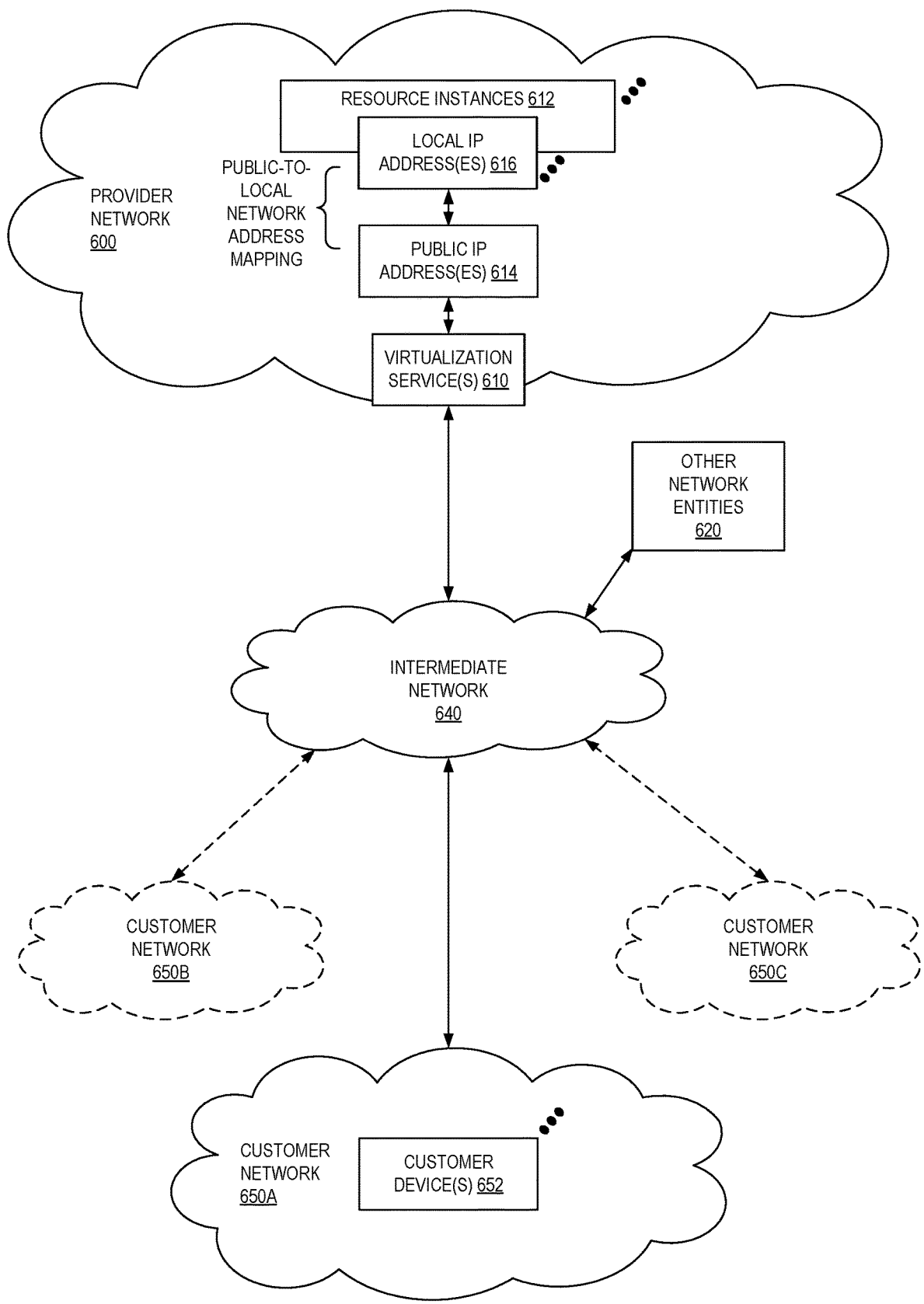
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-'M50C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-'M50C may, for example, implement customer-specific applications and present the customer's applications on an intermediate network 640, such as the Internet. Other network entities 620 on the intermediate network 640 may then generate traffic to a destination public IP address 614 published by the customer network(s) 650A-'M50C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
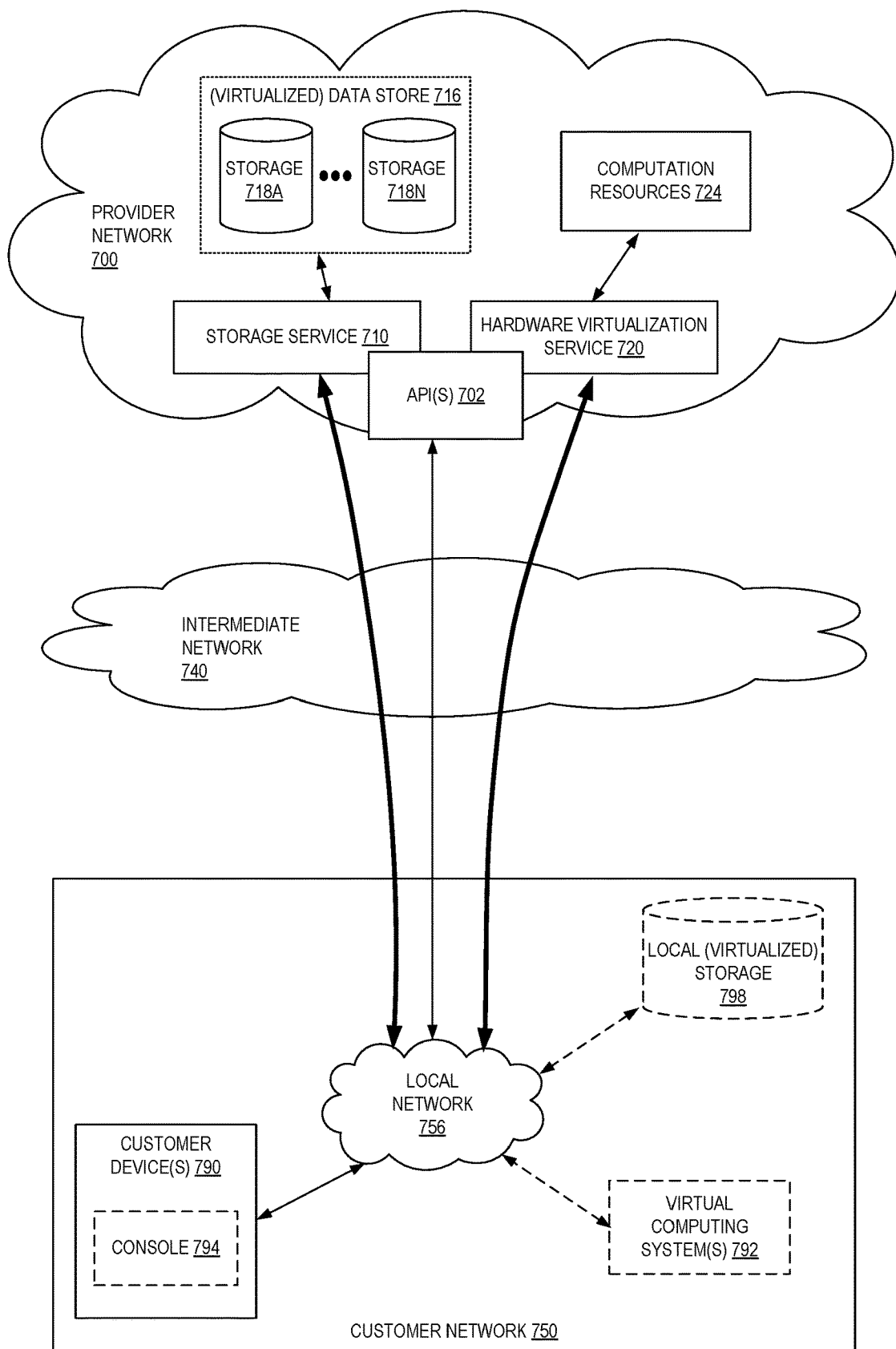
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
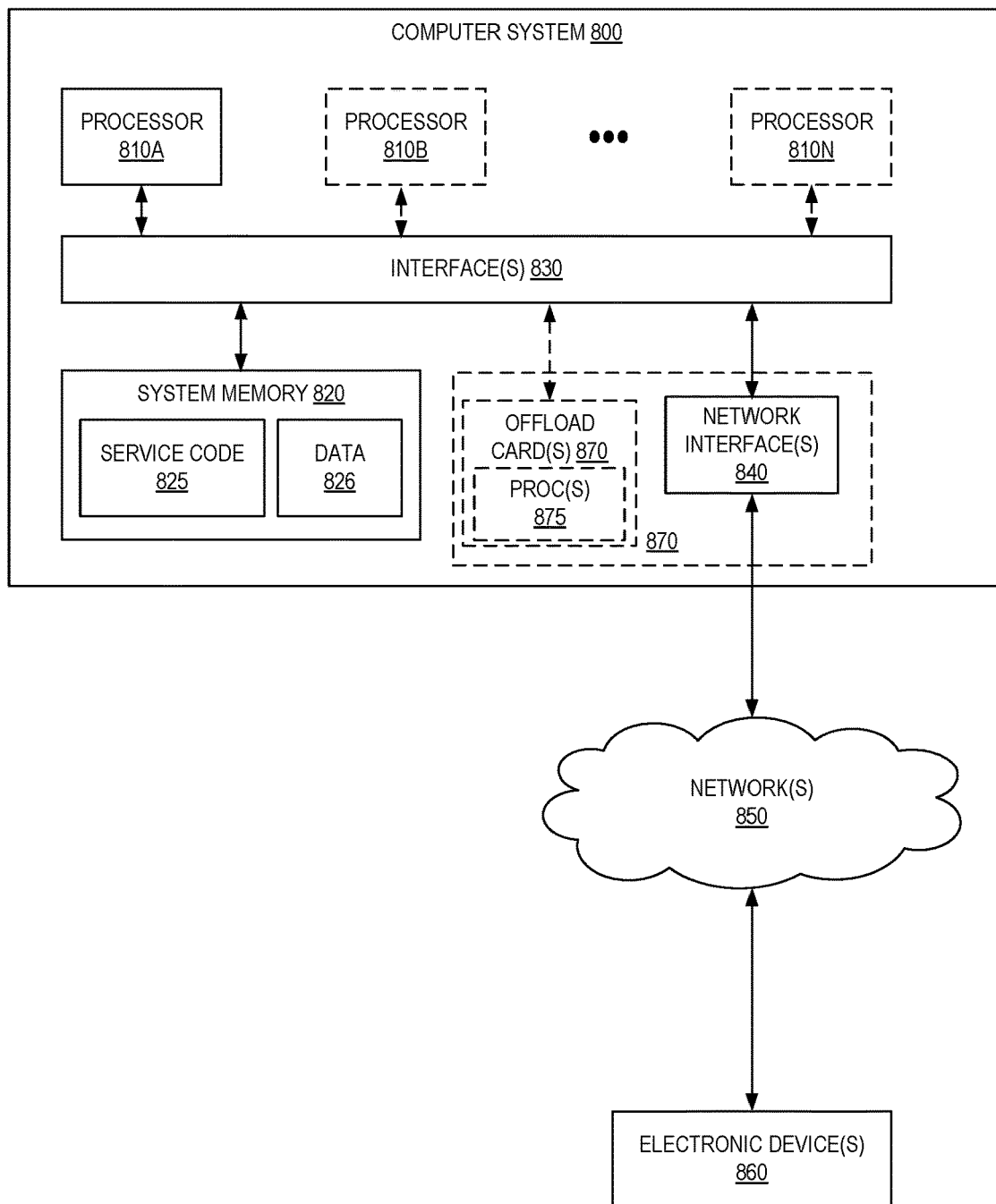
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as service code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, by a multi-service storage layer of a cloud provider network, a request to create a virtual storage resource to be replicated across a set of storage services and across a set of regions of the cloud provider network, wherein the request specifies:
      the set of storage services to use from a plurality of storage services provided by the cloud provider network, wherein the set of storage services provide a heterogeneous set of storage resource types, and
      the set of regions to use from a plurality of regions provided by the cloud provider network;
   creating, at each storage service of the set of storage services and within each region of the set of regions of the cloud provider network, a respective storage resource to be used to redundantly store data items requested for storage in the virtual storage resource;
   receiving, by the multi-service storage layer, a first request to store a data item in the virtual storage resource, the first request sent using a first application programming interface (API) provided by the multi-service storage layer; and
   causing the data item to be stored in the respective storage resource of each storage service of the set of storage services and within each region of the set of regions, wherein the multi-service storage layer causes the data item to be stored by sending a plurality of second requests to store the data item using a plurality of respective second APIs provided by the set of storage services.

2. The computer-implemented method of claim 1, further comprising:
   determining that the data item is stored successfully at a threshold number of storage services of the set of storage services; and
   determining that the data item is stored successfully in a threshold number of regions of the set of regions.

3. The computer-implemented method of claim 1, further comprising:
   receiving a request to obtain the data item from the virtual storage resource; and
   obtaining the data item from the set of storage services, wherein a storage service of the set of storage services is experiencing an outage.

4. A computer-implemented method comprising:
   receiving a request to create a virtual storage resource to be replicated across a plurality of storage services and across a plurality of regions of a cloud provider network, wherein the plurality of storage services provides a heterogeneous set of storage resource types;
   creating, at each storage service of the plurality of storage services and within each region of the plurality of regions of the cloud provider network, a respective storage resource;
   receiving a request to store a data item using the virtual storage resource; and
   causing the data item to be stored in the respective storage resource created at each of the plurality of storage services and within each region of the plurality of regions.

5. The computer-implemented method of claim 4, further comprising:
   determining that the data item is stored successfully at a threshold number of storage services of the plurality of storage services; and
   determining that the data item is stored successfully in a threshold number of regions of the plurality of regions.

6. The computer-implemented method of claim 4, further comprising:
   receiving a request to obtain the data item from the virtual storage resource; and
   obtaining the data item from a storage service of the plurality of storage services that is not experiencing a service outage.

7. The computer-implemented method of claim 4, wherein the request to create the virtual storage resource specifies:
   the plurality of storage services to use from storage services provided by the cloud provider network, and
   the plurality of regions to use from regions provided by the cloud provider network.

8. The computer-implemented method of claim 4, wherein the request to create the virtual storage resource is sent to a multi-service storage layer of the cloud provider network using a first application programming interface (API), and wherein the plurality of storage services provide a plurality of second APIs.

9. The computer-implemented method of claim 4, wherein the request to create the virtual storage resource is sent to a multi-service storage layer of the cloud provider network using a first application programming interface (API), and the first API provides a set of available actions that are defined in part by a respective set of actions provided by each of the plurality of storage services.

10. The computer-implemented method of claim 4, further comprising:
    receiving a query against data stored in the virtual storage resource; and
    executing the query against at least one respective storage resource created at the plurality of storage services.

11. The computer-implemented method of claim 4, wherein the request to store the data item using the virtual storage resource is sent from an application running in the cloud provider network.

12. The computer-implemented method of claim 4, further comprising:
    receiving a request to perform an operation relative to a data item stored in a particular storage resource created at a particular storage service of the plurality of storage services; and
    causing the particular storage service to perform the operation relative to the data item stored in the particular storage resource.

13. The computer-implemented method of claim 4, wherein the virtual storage resource is managed by a multi-service storage layer of the cloud provider network, and wherein the multi-service storage layer stores metadata about the virtual storage resource including at least one of: identifiers of the plurality of the storage services, identifiers of the plurality of regions, or identifiers of the respective storage resources.

14. The computer-implemented method of claim 4, wherein the plurality of storage services includes at least two of: an object storage service, a relational database storage service, a key-value and document database service, a block storage service, a wide column storage service, a ledger storage service, or a file storage service.

15. A system comprising:
    a multi-service storage layer of a cloud provider network implemented by a first one or more electronic devices, the multi-service storage layer including instructions that upon execution cause the multi-service storage layer to:
- receive a request to create a virtual storage resource to be replicated across a plurality of storage services and across a plurality of regions of a cloud provider network, wherein the plurality of storage services provides a heterogeneous set of storage resource types;
- create, at each storage service of the plurality of storage services and within each region of the plurality of regions of the cloud provider network, a respective storage resource,
- receive a request to store a data item using the virtual storage resource,
- cause the data item to be stored in the respective storage resource created at each of the plurality of storage services and within each region of the plurality of regions; and a storage service of the plurality of storage services implemented by a second one or more electronic devices, the storage service including instructions that upon execution cause the storage service to:
- create the respective storage resource,
- receive the request to store the data item in the respective storage resource managed by the storage service, and
- store the data item in the respective storage resource.

16. The system of claim 15, wherein the instructions upon execution further cause the multi-service storage layer to:
- determine that the data item is stored successfully at a threshold number of storage services of the plurality of storage services; and
- determine that the data item is stored successfully in a threshold number of regions of the plurality of regions.

17. The system of claim 15, wherein the instructions upon execution further cause the multi-service storage layer to:
- receive a request to obtain the data item from the virtual storage resource; and
- obtain the data item from the plurality of storage services, wherein a storage service of the plurality of storage services is experiencing an outage.

18. The system of claim 15, wherein the request to create the virtual storage resource specifies:
- the plurality of storage services to use from storage services provided by the cloud provider network, and
- the plurality of regions to use from regions provided by the cloud provider network.

19. The system of claim 15, wherein the request to create the virtual storage resource is sent to a multi-service storage layer of the cloud provider network using a first application programming interface (API), and wherein the plurality of storage services provide a plurality of second APIs.

20. The system of claim 15, wherein the request to create the virtual storage resource is sent to a multi-service storage layer of the cloud provider network using a first application programming interface (API), and the first API provides a set of available actions that are defined in part by a respective set of actions provided by each of the plurality of storage services.

* * * * *